United States Patent

Kopras

[11] Patent Number: 5,143,490
[45] Date of Patent: Sep. 1, 1992

[54] BIT FOR CUTTING SHEETROCK
[75] Inventor: Robert K. Kopras, Black Earth, Wis.
[73] Assignee: Roto Zip Tool Corporation, Cross Plains, Wis.
[21] Appl. No.: 736,398
[22] Filed: Jul. 26, 1991
[51] Int. Cl.⁵ .................. B23B 51/08; B23C 51/10
[52] U.S. Cl. .................. 408/26; 144/219; 407/54; 407/63; 408/230
[58] Field of Search .................. 408/26, 227, 230; 407/34, 53, 54, 63; 144/219, 240, 241

[56] References Cited

U.S. PATENT DOCUMENTS 2,377,329 6/1945 Dettmer .................. 407/154
2,623,552 12/1952 Compton et al.
2,887,136 5/1959 Rathgeber .................. 144/219
3,078,546 2/1963 Kiernan .................. 407/53 X
3,133,339 5/1964 Ribich .................. 407/54
3,701,188 10/1972 Wall et al. .................. 144/240 X
3,913,196 10/1975 Maday .................. 407/54

Primary Examiner—Steven C. Bishop
Attorney, Agent, or Firm—Wood, Herron & Evans

[57] ABSTRACT

Disclosed is a bit which can be cut both axially and laterally, and which is especially useful to cut an access opening in a sheetrock panel covering an electrical outlet box. The bit self-guides itself laterally around the periphery of the outlet box so that the opening will correspond to the shape of the box. The configuration of the bit permits it to be made in an unusually small diameter so as to minimize the width of the slot it cuts.

11 Claims, 2 Drawing Sheets

BIT FOR CUTTING SHEETROCK

FIELD OF THE INVENTION

This invention relates to router bits and more specifically to a bit for cutting sheetrock.

BACKGROUND OF THE INVENTION

In the construction industry sheetrock (or "drywall") is frequently used to cover large wall areas. In the interest of speed it is common first to put up a large sheetrock panel, covering apertures in the wall such as electrical outlet boxes and even window and door areas, and thereafter to cut openings in the sheetrock to expose or open the electrical outlet box, window, or door. This saves substantial time in comparison to precutting the panel to fit to the edge of the opening, before fastening the panel.

Special bits are known for such cutting. They are generally used in a router operating at a speed in excess of about 20,000 rpm.

For such use the bit must be able to cut both axially through a sheetrock panel, and then cut laterally in it, i.e., in a direction perpendicular to the length of the bit, thereby to make the opening in the panel. In other words, the bit must function both as a drill and as a saw.

A conventional twist drill bit performs poorly for such use: it cuts well in the axial direction, but cuts laterally only poorly because of the flute configuration. It is convenient to use the box wall itself as a "template" for cutting an opening around a box, moving the bit sideways while guiding it along the side of the box. A conventional bit will not move smoothly around the side of an electrical outlet box or door; if guided against the box it will abrade or cut into the box wall, thereby dulling itself and marring the box or other opening. Moreover, the conventional drill configuration tends to convey powdered cut sheetrock material outwardly into the room, where it must ultimately be swept up.

The so-called "WD-5" bit once marketed by the Roto-Zip Tool Corporation of Cross Plains, WI, was specially intended for cutting sheetrock. It cut both axially and laterally and had a single flute in the form of a so-called "down" or reverse spiral. (In a conventional twist drill bit, the spiral flutes advance toward the tip in the same direction as the bit is operated, all bits conventionally being rotated in the clockwise direction.) In the WD-5 bit the spiral advanced away from the direction of rotation, that is, oppositely to the usual flute direction. However, the WD-5 bit was subject to severe abrasion when it was guided around the periphery of an outlet box. Moreover, the bit was about ¼" in diameter and so tended to cut a wider kerf or slot than was desirable. If made in smaller diameter, shear strength was lost and the bit tended to break off too easily.

Kerf width is especially important when cutting around an electrical outlet box. The box opening is ultimately covered by a cover plate which usually extends outwardly about ⅛" beyond the periphery of the box itself. If a bit which is ¼" wide is used to cut around the outside of the box, it can be seen that the resulting panel opening may extend almost to the edge of the cover, and in some cases the cover may have an insufficient margin of overlap to cover the opening in the panel. Moreover, if the bit is kept away from the box in order to minimize tip abrasion, the effective width of the opening it cuts is further increased.

Thus there has been a need for a bit for cutting sheetrock (including drywall, gypsum board, plaster, "Gypsonite" and "Fiberbond" composite board materials, and other similar materials), which is sufficiently strong that it can be made in a diameter as small as ⅛" without an excessive breakage rate in use, yet which can be guided along the wall of an outlet box or other surface without undue abrasion.

SUMMARY OF THE INVENTION

In accordance with a preferred form of this invention a bit is provided which has a conically pointed, fluted tip for cutting axially through a sheetrock panel. The tip has two diametrically opposed straight flutes for cutting into and through the panel. In addition to the tip flutes, the bit has a plurality of body flutes for cutting laterally. The body flutes form a spiral on the bit that extends toward the tip in a direction which, when the bit is rotated, tends to resist advancement of the bit into the panel being cut. This spiral direction tends to convey the cut chips and powder into the wall, rather than outwardly into the room, so that cleanup is reduced. Preferably the bit has three body flutes. It has been found especially desirable that the body flutes be of a so-called "parabolic grind" configuration, having an S-curvature as viewed in transverse cross-section.

The tip flutes are spaced axially from and do not join or open into the body flutes. Between the tip flutes and the outer end of the body flutes there is an unfluted annular cylindrical band which extends around the body of the bit. This unfluted band has been found to provide a guide or bearing surface on which the bit can be guided around an electrical outlet box. Provision of this guide surface minimizes abrasion of the cutting edge of the flutes as well as minimizes damage to the electrical guide box or other structure along which the bit is guided. Moreover, the absence of body flutes at the tip has been found to reduce nicking and cutting of electric leads to the box.

Surprisingly, the bit has sufficient shear strength, even in a diameter as small as ⅛", to display much better resistance to breakage in use in comparison to prior bits.

DESCRIPTION OF THE DRAWINGS

The invention can best be further described by reference to the accompanying drawings, in which.

DETAILED DESCRIPTION

Figure 1:
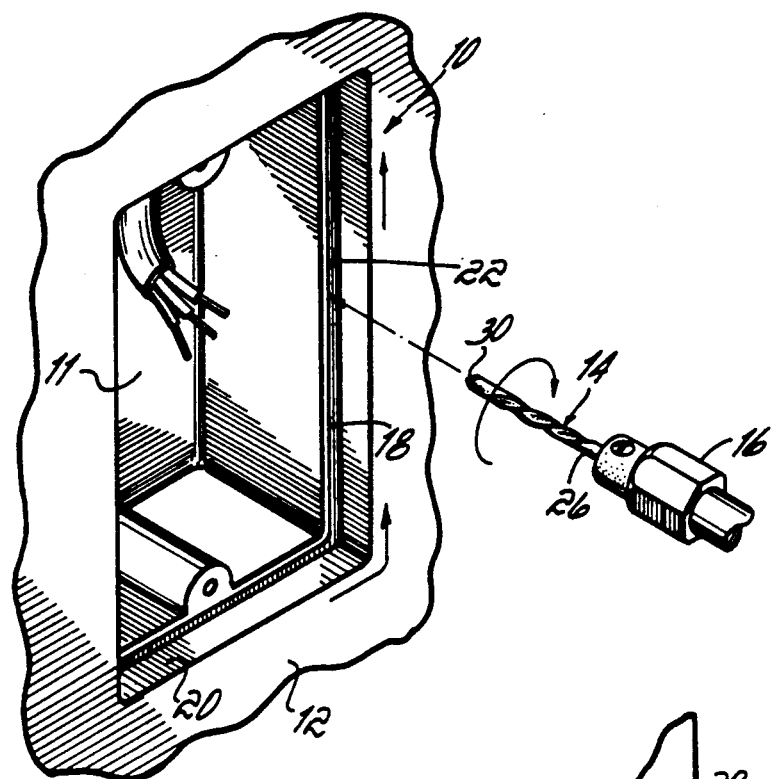
FIG. 1 is a diagrammatic perspective view showing a sheetrock panel being cut to form an opening around the outer periphery of an electrical box, by a bit in accordance with a preferred embodiment of the present invention.

FIG. 1 illustrates one use of the bit of the invention. A conventional metal electrical outlet or junction box 10, having a generally rectangular interior opening 11, is mounted to studding or other wall structure, not shown. A sheetrock panel 12 has been nailed to the wall structure to cover the outlet box. A bit 14 in accordance with the invention, mounted in the chuck 16 of a router tool not illustrated in detail, is used to cut an opening 20 through the panel corresponding to the shape of box 10, so that the interior of the box will be accessible for wiring and mounting a switch or plug socket. In cutting opening 20, the bit first is moved axially to cut into panel 12, and then is moved laterally, i.e., perpendicular to the bit axis and parallel to the surface of panel 12, to cut around the outside perimeter of the box. It is desirable to use a router having a depth gauge, to insure proper depth of bit insertion. It can be seen that if the bit 14 tracks on or is guided along the outside wall 18 of box 10, a gap or slot 22 will be formed between outside wall 18 and the cut edge 24 of panel 12. The width of slot 22 will at least be equal to the cutting diameter of bit 14. (It should be noted that the bit may also be used to cut around the inside of a door, window or box, as well as around the outside of a box.)

Once a switch or outlet has been mounted in box 10, the opening 20 will be covered by a cover plate (not shown). A conventional cover plate is usually only slightly wider and longer than the OD dimensions of the box itself. Thus if gap 22 is too wide the cover plate will not adequately cover it. It is desirable that the cutting width of bit 14 be no more than about ⅛ or 3/16" diameter, to cut a slot so narrow that the opening will be completely covered.

Figure 3:
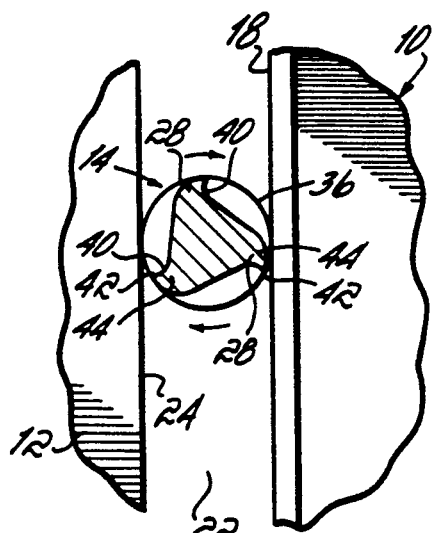
FIG. 3 is a transverse section taken on line 3—3 of FIG. 2.
Figure 4:
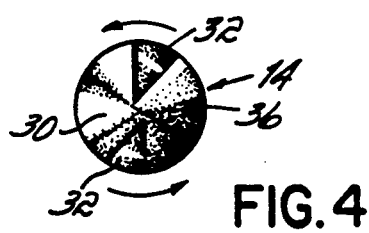
FIG. 4 is an axial view of the tip end of the bit.

At one end (or in the middle, if double ended) the bit 14 has an unfluted shank 26 by which it can be gripped in chuck 16. The bit has a series of spirally curving body flutes 28, three in the embodiment shown (FIGS. 2 and 3), which extend from the shank toward but not to the tip 30 of the bit. Tip 30 is conical, preferably having a 120° included angle at the tip, and is provided with two tip flutes which, as best shown in FIG. 4, are straight V-shaped flutes 32, 32, on opposite sides of the bit. It is the function of the tip flutes to cut axially through the panel, so that the body flutes can then cut sidewise through it.

Between tip 30 and the flutes 32 is an unfluted annular, circular cylindrical guide band 36 which extends around the bit. Neither the spiral body flutes 28 nor the tip flutes 32 extend across this guide band, that is, the guide band is continuous and unfluted around the periphery of the bit. The diameter of the guide band may be the same as that of shank 26 and substantially the same as the cutting diameter of the body flutes (see FIG. 3).

Figure 2:
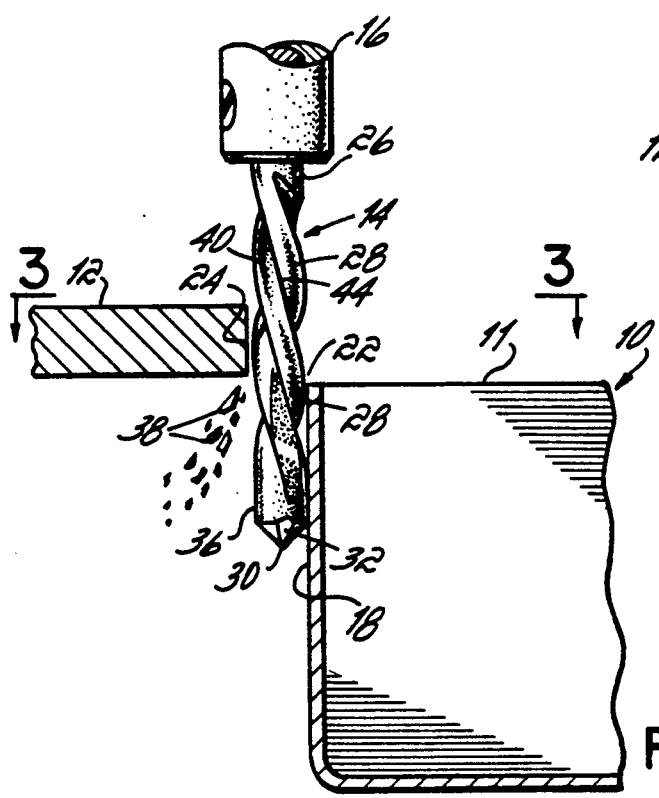
FIG. 2 is an enlarged section through an outlet box covered by a sheetrock panel, showing the bit riding on and being guided by the outside of the box.

As shown in FIG. 2 the body flutes 28 extend in "left hand" or "down" spiral toward the guide band and tip. In use, the bit is rotated in clockwise rotation, as virtually all router motors conventionally do. The "down" orientation of the spiral tends to resist advancement of the bit into the workpiece, that is, the engagement of the cutting edges of the body flutes with the sheetrock panel tends to urge the bit outwardly, rather than pulling the bit inwardly. This direction of the spiral is the reverse of the usual direction of spiral flutes. It has the effect of carrying the cuttings 38 into the wall, rather than outwardly into the room.

Figure 5:
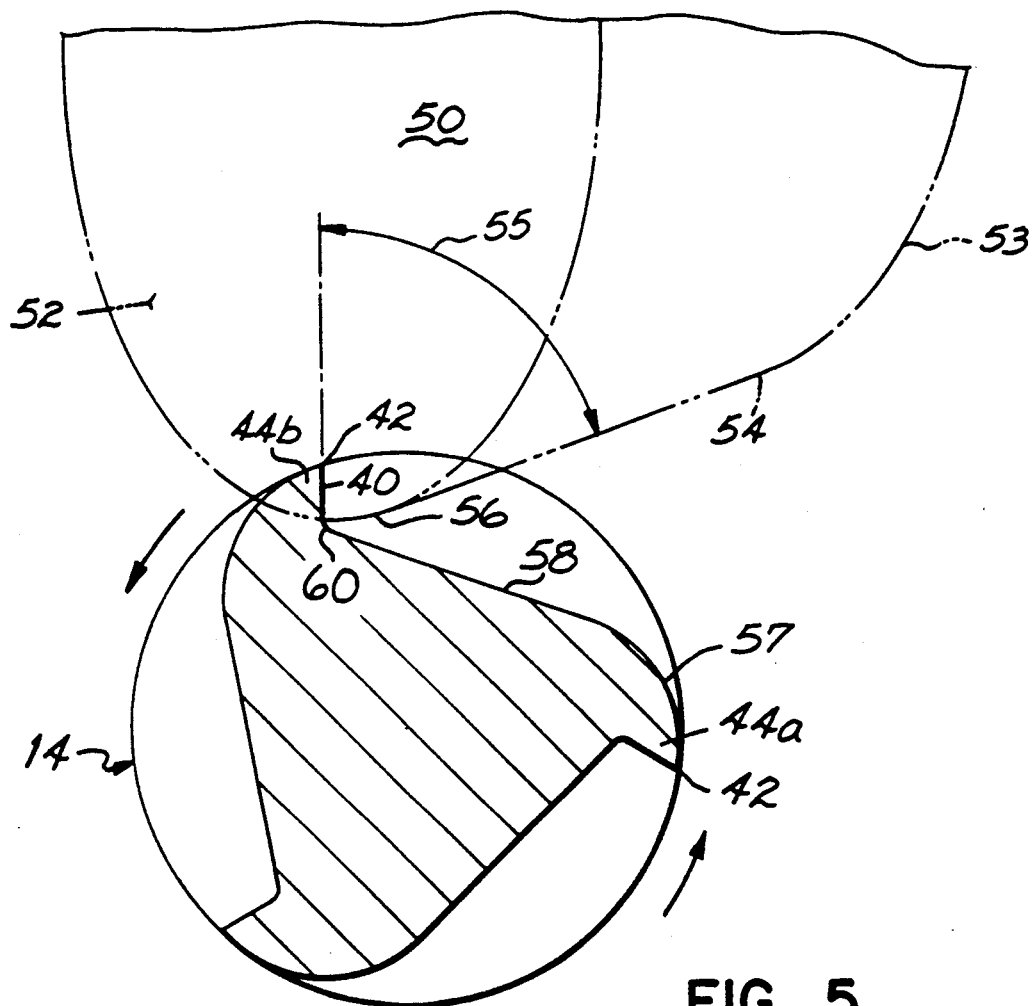
FIG. 5 is an enlarged cross section of a bit being ground to the preferred "parabolic" flute configuration.

It is preferred that the bit have at least three evenly spaced flutes, each made by the so-called "parabolic" grinding process, as shown in FIG. 5. This configuration provides an inwardly curving web 44 of substantial mass behind each cutting edge 42, thereby strengthening the bit and reducing breakage, especially in smaller diameters, in comparison to bits having a different flute section. In contrast to a conventional grind, the web 44 does not have a circumferential land of the same diameter as the cutting edge. So-called parabolic grinding (which does not necessarily form a true parabolic curve in the flutes) is known in flute grinding art; however, so far as I know, it has not previously been used in a left hand flute configuration, or in a sheetrock bit.

To grind a "parabolic" flute, a grinding wheel 50 is used, having opposite side faces 52, 53 and a peripheral rim 54. Wheel rim 54 meets side face 52 at an included angle 55 of about 70° between them. For a bit of about 0.125" diameter, wheel 50 may be about 0.200" thick. To form the spiral the wheel, skewed to the axis of the bit, is advanced into a bit blank as the blank is rotated (counterclockwise in FIG. 5), in accordance with known flute grinding procedure. Wheel corner 56 cuts a concave curve at the bottom of the leading face 40 of a web 44b, and rotation of the bit forms a convex curve 57 leading to the adjacent web 44a. Thus, as seen in section (FIG. 5), the flute has an S-curve: behind the cutting edge 42 of a first web 44a, the surface curves inwardly along a convex curve 57 to a flute bottom 58 which is substantially flat, then curves outwardly in a tight concave curve 60, to the cutting edge 42 of a following web 44b. Each web 44 thus has a relatively wide and rounded section, but without a land of equal diameter behind it. The maximum depth of the flute (at surface 58) is preferably less than about ¼ the diameter of the bit.

Surprisingly, it has been found that the use of a parabolic grind flute configuration tends to strengthen the bit by providing a larger and stronger body of metal in the land behind each cutting face so that even in diameters as small as ⅛" diameter, the bit will not break or wear unduly. Moreover, this configuration facilitates the use of three flutes rather than two, which of itself strengthens the bit. With other flute configurations the bits tend to break more easily.

Bit 14 is preferably formed from a cylindrical rod of tool steel, for example molybdenum type high speed tool steel such as grade M1. After grinding the bit is hardened, preferably to 60–65 Rockwell C hardness. Hardening is preferably carried out by heating an M1 steel bit to about 2205° F. in a diamond block controlled (reducing) atmosphere furnace; oil quenching it; and twice annealing it by heating to 1020° F. for 2 hours followed by slow cooling to room temperature.

FIG. 2 shows the bit in use. The guide band 36 tracks along a box wall to guide the bit closely along the box periphery. The continuous circumferential band 36 rides against the outside wall 18 of the box, preventing the cutting edges 42 of the flutes from being abraded by the box wall while they are cutting through the sheetrock. The bit is preferably rotated at a speed of about 25,000 rpm, but this is not critical.

The axial length of guide band 36 need not be great. For a bit of about ⅛" diameter, a band 36 with an axial dimension of only 1/16–⅛" is sufficient. It is the fact that the guide band is continuous around its periphery, rather than a particular axial length of the guide band that is critical to the guide function. The overall flute length may be about 1" up to the shank. (Double-ended bits may have flutes on both ends, with a shank in the middle.)

In comparison to prior sheet rock bits, the present bit cuts faster and with a lower breakage rate. It conveys chips inwardly rather than outwardly, and cuts a narrower slot. It is effective even on fiber-containing composite sheet materials such as "Fiberbond" which it cuts with a smoother surface finish because the fibers are curled inwardly rather the outwardly.

Having described the invention, what is claimed is:

1. A bit for cutting axially and laterally through a sheetrock panel, said bit comprising,
   a tip for cutting axially,
   a plurality of body flutes for cutting laterally, said flutes forming a spiral on said bit which extends toward said tip in a direction which, when the bit is rotated in use, tends to resist advancement of the bit into a panel being cut,
   an unfluted annular band extending around said bit between said tip and a leading end of said spiral, said unfluted band providing a bearing surface on which said bit can be guided around an electrical outlet box to cut a panel covering said box, and
   a shank by which said bit can be chucked.

2. The bit of claim 1 wherein, as viewed in cross section, each body flute has an S-curvature following a cutting edge, said S-curvature including a convex inward curve, then a circumferential portion, then a concave outward curve, to a following cutting edge.

3. The bit of claim 1 wherein said convex inward curve begins immediately behind said cutting edge, there being no land of diameter equal to that of said cutting edge.

4. The bit of claim 1, wherein the depth of each flute is less than ¼ the diameter of said bit.

5. The bit of claim 1 wherein said flute is parabolically ground.

6. The bit of claim 1 wherein said spiral is a left hand spiral.

7. The bit of claim 1 wherein said spiral comprises three said flutes.

8. The bit of claim 1 wherein said tip is conical and has at least two tip flutes on it.
   said tip flutes terminating at said band.

9. The bit of claim 8 wherein said tip has two said tip flutes,
   said tip flutes being diametrically opposite one another.

10. The bit of claim 8 wherein said tip flutes are straight.

11. The bit of claim 1 wherein the diameter of said bit is no larger than about ⅛.

* * * * *